UNITED STATES PATENT OFFICE.

MICHAEL SMITH, OF PASSAIC, NEW JERSEY.

MOLD FOR CASTING METALS.

1,281,679.

Specification of Letters Patent.  Patented Oct. 15, 1918.

No Drawing.   Application filed December 28, 1917.  Serial No. 209,330.

*To all whom it may concern:*

Be it known that I, MICHAEL SMITH, a citizen of the United States, residing at Passaic, county of Passaic, State of New Jersey, have invented certain new and useful Improvements in Molds for Casting Metals, of which the following is a specification.

My invention relates to molds for casting metals and more particularly to the composition from which such molds are formed.

In the art of metal casting, particularly in that special branch of the art which has to do with casting articles designed with fine details of light "body", certain requisites have been long recognized, but as yet no perfectly satisfactory composition for molds has been invented. The requisites referred to are:

First, sufficient strength to withstand the tendency to crack when baked at a high temperature, and to stand up under the pressure sometimes used in forcing the metal into the mold.

Second, in order to produce artistic results, the mold must have a closeness of texture sufficient to enable it to take and retain the sharp, fine details of the pattern.

Third, some degree of porosity is required for egress of the trapped air and gases given off by the molten metal during the casting operation.

Previous attempts to obtain a composition for molds having all of the above-mentioned desirable qualities have not been wholly successful. For example, ingredients which have been added for the purpose of strengthening the mold when baked, have impaired its closeness of texture and similarly, a composition having the requisite compactness will lack porosity or strength, or both.

I have discovered that a mixture of plaster of Paris, asbestos fiber and brick dust, mixed together with water, formed, and then baked in the usual manner, will possess in a very high degree, the desired attributes of strength, porosity and closeness of texture.

In carrying out my invention I have found that the relative proportions of the above mentioned ingredients should be varied in accordance with the particular metal which it is desired to cast. For example, in preparing my composition for metals which melt at a high temperature, say 1800° F. or over, I prepare a thick creamy slush of water with forty parts of plaster of Paris and add thereto thirty parts of short asbestos fibers and thirty parts of finely divided brick dust. When formed into the mold, I then bake the same at a temperature of say 700° F. For metals which melt at relatively low temperatures, as for example 1200° F. or under, the relative proportions of ingredients and the baking temperature are changed. In such cases, plaster should form about eighty parts, brick dust nineteen parts and asbestos fibers one part and the baking temperature may be 200° F.

I find that molds made from the composition described meet all the requirements. Closeness of texture is, of course, mainly attributable to the plaster of Paris which should form as large a proportion of the ingredients as is consistent in view of the strength and porosity demanded. Thus when lower temperatures are employed, as with metals melting at 1200° or under, the percentage of plaster of Paris is increased accordingly. Asbestos fibers furnish strength to the composition and the particles of the brick dust which are of cellular construction render the mass more porous.

I claim:—

1. A mold for metal casting, formed of a mixture of plaster of Paris, asbestos fibers and brick dust with water, and baked substantially dry.

2. A composition for molds comprising plaster of Paris, asbestos fibers and brick dust.

3. A composition for molds consisting of plaster of Paris, asbestos fibers and brick dust, in substantially the following proportions: plaster of Paris forty parts, asbestos fibers thirty parts, brick dust thirty parts.

MICHAEL SMITH.